(12) United States Patent
Park

(10) Patent No.: US 9,998,671 B2
(45) Date of Patent: Jun. 12, 2018

(54) ELECTRONIC APPARATUS, METHOD OF CONTROLLING THE SAME, AND COMPUTER-READABLE RECORDING MEDIUM

(71) Applicant: OCEANS CO., LTD., Seoul (KR)

(72) Inventor: Sung Jyn Park, Jeju-si (KR)

(73) Assignee: OCEANS CO., LTD., Seoul (KR)

( * ) Notice: Subject to any disclaimer, the term of this patent is extended or adjusted under 35 U.S.C. 154(b) by 130 days.

(21) Appl. No.: 14/888,910

(22) PCT Filed: May 27, 2014

(86) PCT No.: PCT/KR2014/004702
§ 371 (c)(1),
(2) Date: Nov. 3, 2015

(87) PCT Pub. No.: WO2014/193136
PCT Pub. Date: Dec. 4, 2014

(65) Prior Publication Data
US 2016/0088229 A1    Mar. 24, 2016

(30) Foreign Application Priority Data

May 29, 2013 (KR) .................. 10-2013-0061304
Oct. 18, 2013 (KR) .................. 10-2013-0124844

(51) Int. Cl.
H04N 5/232   (2006.01)
G06T 11/00   (2006.01)
(Continued)

(52) U.S. Cl.
CPC .......... H04N 5/23293 (2013.01); B43L 13/18 (2013.01); G06T 11/001 (2013.01);
(Continued)

(58) Field of Classification Search
CPC ............... H04N 5/23293; H04N 5/265; H04N 5/23216; G06T 11/001; G06T 11/60; B43L 13/18
See application file for complete search history.

(56) References Cited

U.S. PATENT DOCUMENTS 6,867,801 B1 * 3/2005 Akasawa ............. H04N 1/0035
345/633
7,656,429 B2   2/2010 Larson
(Continued)

FOREIGN PATENT DOCUMENTS

JP        3151886 U       6/2009
KR    10-2008-0058779 A   6/2008
(Continued)

OTHER PUBLICATIONS

Sarah Trefny, How to Draw on a Cookie with an iPad, Klickitat Street, Mar. 25, 2013, pp. 1-17, Retrieved from the internet: URL: http://www.klickitatstreet.com/2013/03/how-to-draw-on-cookie-with-ipad.html.
(Continued)

Primary Examiner — Luong T Nguyen
(74) Attorney, Agent, or Firm — Novick, Kim & Lee, PLLC; Sang Ho Lee

(57) ABSTRACT

Disclosed herein is a method of controlling an electronic apparatus. The method of controlling an electronic apparatus includes: selecting a specific image; generating a first image having a contour line and an adjusted transparency for the selected image; and displaying the generated first image in a state in which the generated first image is overlapped with a photographed image corresponding to live-view-photographing of the electronic apparatus.

13 Claims, 14 Drawing Sheets

(51) Int. Cl.
*H04N 5/265* (2006.01)
*G06T 11/60* (2006.01)
*B43L 13/18* (2006.01)

(52) U.S. Cl.
CPC ......... *G06T 11/60* (2013.01); *H04N 5/23216* (2013.01); *H04N 5/265* (2013.01)

(56) References Cited

U.S. PATENT DOCUMENTS

| | | | |
|---|---|---|---|
| 9,343,043 B2* | 5/2016 | Lowe | G09G 5/377 |
| 2012/0268641 A1* | 10/2012 | Kazama | H04N 5/23212 |
| | | | 348/333.11 |
| 2014/0211031 A1* | 7/2014 | Han | H04N 5/23222 |
| | | | 348/208.99 |

FOREIGN PATENT DOCUMENTS

| | | |
|---|---|---|
| KR | 10-2012-0041049 A | 4/2012 |
| KR | 10-2012-0118218 A | 10/2012 |

OTHER PUBLICATIONS

Anonymous, "Using My Camera Lucida iPad app", Cameralucidaforsale, Nov. 28, 2011, pp. 1-14, Retrieved from the internet: URL: http://www.cameralucidaforsale.com/post/13454650773/using-my-camera-lucida-ipad-app.

Cameralucidademo, "Camera Lucida iPad App Demo—Graphite Portrait", Dec. 17, 2011, pp. 1-3, Retrevied from the Internet: URL: http://www.youtube.com/watch?v=-15H8ICC854.

* cited by examiner

ELECTRONIC APPARATUS, METHOD OF CONTROLLING THE SAME, AND COMPUTER-READABLE RECORDING MEDIUM

TECHNICAL FIELD

The present invention relates to an electronic apparatus, a method of controlling the same, a computer-readable recording medium, and more particularly, to an electronic apparatus performing image processing, a method of controlling the same, a computer-readable recording medium.

BACKGROUND ART

In accordance with the development of an electronic technology, various kinds of electronic apparatuses have been developed and spread. Particularly, electronic apparatuses such as a high-tech smart phone, a smart glasses, and the like, based on an excellent information technology (IT) have been spread.

Recently, due to reduction of prices, improvement of performance of high-tech electronic apparatuses, and the like, a demand for the high-tech electronic apparatuses has been increased. Therefore, an effort to develop various and convenient use methods consistent with the high-tech electronic apparatuses has also been accelerated.

As a result, the development for various applications for the purpose of convenience of users using the electronic apparatuses has been demanded.

DISCLOSURE

Technical Problem

An object of the present invention is to provide an electronic apparatus capable of generating an image having a contour line and an adjusted transparency for a specific image and displaying the generated image together with a photographed image corresponding to live-view-photographing, a method of controlling the same, a computer-readable recording medium.

Technical Solution

According to an exemplary embodiment of the present invention, there is provided a method of controlling an electronic apparatus, including: selecting a specific image; generating a first image having a contour line and an adjusted transparency for the selected image; and displaying the generated first image in a state in which the generated first image is overlapped with a photographed image corresponding to live-view-photographing of the electronic apparatus.

According to another exemplary embodiment of the present invention, there is provided an electronic apparatus including: a photographing unit; a display unit displaying a screen; an input unit receiving a user input for selecting a specific image; and a control unit generating a first image having a contour line and an adjusted transparency for the selected image and controlling the display unit to display the first image in a state in which the first image is overlapped with a photographed image corresponding to live-view-photographing of the electronic apparatus.

According to still another exemplary embodiment of the present invention, there is provided a computer-readable recording medium in which program codes for performing a method of controlling an electronic apparatus are recorded, wherein the method of controlling an electronic apparatus includes: selecting a specific image; generating a first image having a contour line and an adjusted transparency for the selected image; and displaying the generated first image in a state in which the generated first image is overlapped with a photographed image corresponding to live-view-photographing of the electronic apparatus.

According to yet still another exemplary embodiment of the present invention, there is provided a method of controlling an electronic glasses, including: receiving a user input selecting an image that a wearer wants to view and draw; generating a first image having a contour line and an adjusted transparency for the selected image; and displaying the generated first image in a state in which the generated first image is overlapped with a front view recognized by vision of the wearer of the electronic glasses.

According to yet still another exemplary embodiment of the present invention, there is provided an electronic glasses, including: a display unit providing a display effect to a front view recognized by vision of a wearer of the electronic glasses; an input unit receiving a user input selecting an image that the wearer wants to view and draw; and a control unit generating a first image having a contour line and an adjusted transparency for the selected image and controlling the display unit to display the generated first image in a state in which the generated first image is overlapped with the front view recognized by the vision of the wearer of the electronic glasses.

According to yet still another exemplary embodiment of the present invention, there is provided a computer-readable recording medium in which program codes for performing a method of controlling an electronic glasses are recorded, wherein the method of controlling an electronic glasses includes: receiving a user input selecting an image that a wearer wants to view and draw; generating a first image having a contour line and an adjusted transparency for the selected image; and displaying the generated first image in a state in which the generated first image is overlapped with a front view recognized by vision of the wearer of the electronic glasses.

Advantageous Effects

As described above, according to various exemplary embodiments of the present invention, a photographed image and a first image image-processed (having a contour line and an adjusted transparency for a specific image) may be displayed in a displayed screen in a state in which they are overlapped with each other. Therefore, a user may easily view and draw a displayed picture on a medium such as a paper while viewing the displayed screen. That is, the user may obtain an effect felt as if he/she views and draws the picture using a transparent film or an oilpaper through the electronic apparatus.

According to various exemplary embodiments of the present invention, anybody may easily view and draw a picture that he/she wants to draw. As an example, when visual data (image) such as a favorite star, a car that somebody wants to possess, a family photograph, a landscape, a bromide, or a picture book that somebody wants to directly draw, or the like, are present, anything may be easily viewed and drawn. In this case, a sketch may be made along the contour line, and contrast representation and coloring may be performed by adjusting a transparency of a third image for an original image.

BEST MODE

Figure 1:
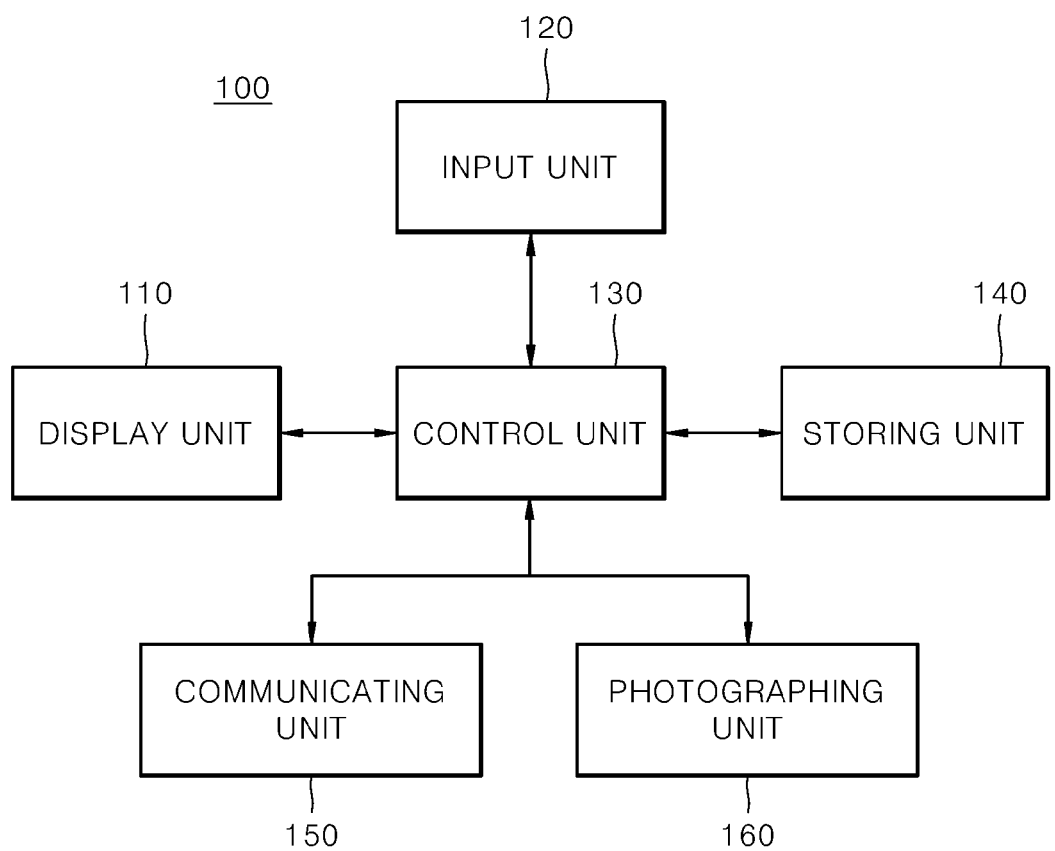
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided by using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 includes all or some of a display unit 110, an input unit 120, a control unit 130, a storing unit 140, a communicating unit 150, and a photographing unit 160.

Here, the electronic apparatus 100 may be implemented as various apparatuses such as a digital camera, a smart phone, a tablet computer, a laptop computer, a personal digital assistant (PDA), a portable multimedia player (PMP), a digital television (TV), a smart glasses, a project glasses, and the like, having a camera function.

The display unit 110 serves to display a screen. Particularly, when an application (for example, a picture viewing and drawing application) for implementing various exemplary embodiments of the present invention is executed, the display unit 110 may display screens as illustrated in FIGS. 3 to 9.

Here, the display unit 110 may be implemented by at least one of a liquid crystal display, a thin film transistor-liquid crystal display, an organic light-emitting diode, a flexible display, a 3D display, a transparent display, a head up display (HUD), a head mounted display (HMD), and a prism project display.

The input unit 120 receives a user input manipulating the electronic apparatus 100.

Here, the input unit 120 may be implemented using at least one of various types of buttons, a touch sensor receiving a touch input for the display unit 110, a proximity sensor receiving a motion of approaching the display unit 110 without directly contacting a surface of the display unit 110, and a microphone receiving a speech input of a user. However, the input unit is not limited thereto, but may also be implemented in any form that may receive the user input.

The storing unit 140 serves to store various data and applications required for an operation of the electronic apparatus 100 therein. Particularly, the storing unit 140 may store the 'picture viewing and drawing application' for implementing various exemplary embodiments of the present invention therein.

Here, the storing unit 140 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, or the like.

The communicating unit 150 may allow communication between the electronic apparatus 100 and an external apparatus to be performed. Here, the communicating unit 150 may have a connection form in a wireless or wired scheme through a local area network (LAN) and the Internet network, a connection form through a USB port, a connection form through a mobile communication network such as the 3G and 4G mobile communication networks, and a connection form through a short range wireless communication scheme such as near field communication (NFC), radio frequency identification (RFID), Wi-Fi, or the like.

The photographing unit 160 may generate an image by photographing a subject. Particularly, the photographing unit 160 may generate an image by live-view-photographing the subject. Here, the live-view-photographing means that the user performs photographing while confirming the display unit 110 displaying an image photographed in the electronic apparatus 100 in real time. Meanwhile, the photographing unit 160 may provide the generated photographed image to the control unit 130.

The control unit 130 controls a general operation of the electronic apparatus 100. Particularly, the control unit 130 may control all or some of the display unit 110, the input unit 120, the storing unit 140, the communicating unit 150, and the photographing unit 160 in connection with the executed 'picture viewing and drawing application'.

In detail, when one of a plurality of drawing modes is selected, the control unit 130 may control a general operation of components of the electronic apparatus 100 to perform an operation corresponding to the selected drawing mode. Here, the drawing mode may include at least one of a 'character drawing mode', a 'photograph taking and viewing and drawing mode', a 'gallery photograph drawing mode', an 'animal/plant drawing mode', a 'transportation means drawing mode', a 'portrait drawing mode', and a 'precision description mode'. Here, when the 'photograph taking and viewing and drawing mode' is selected, the photographing unit 160 may be driven, and image processing may be performed on the photographed image generated through the photographing in the photographing unit 160. In addition, in other drawing modes, after a specific image among pre-stored images is selected, image processing may be performed on the specific image. In addition, in the 'precision description mode, after an image is photographed or a specific image is selected, image processing may be performed on the photographed image or the specific image.

That is, after the drawing mode described above is selected, an image that the user wants to view and draw may be selected. Here, the image that the user wants to view and draw may be an image pre-stored in the storing unit 140, the image generated through the photographing in the photographing unit 160, or an image received from the external apparatus through the communicating unit 150.

Meanwhile, when the image that the user of the electronic apparatus 100 wants to view and draw is selected by the operation described above, the control unit 130 may generate a first image having a contour line and an adjusted transparency for the selected image.

As an example, the first image may be generated by combining a second image generated by extracting a contour line in the selected image and a third image generated by adjusting a transparency in the selected image with each other. That is, the first image may be an image in which the contour line of the image selected by the user and the image having the adjusted transparency are viewed to be completely overlapped with each other.

In this case, the control unit 130 may generate the second image by extracting the contour line in the selected image. As an example, the control unit 130 may extract the contour line by extracting a region in which pixel values are changed by a preset magnitude or more in the selected image. However, this is only an example. That is, contour lines for various objects included in the selected image may be extracted using various known contour line extracting algorithms, and the second image consisting of only the extracted contour lines may be generated. In addition, the control unit 130 may generate the third image by adjusting the transparency in the selected image. As an example, in the case in which a user input manipulating a transparency level is not separately received, the control unit 130 may generate the third image by applying an A (ALPHA) value corresponding to a default transparency level among RGBA values of the selected image. Here, the default transparency levels may be set to be different from each other depending on the plurality of drawing modes.

Alternatively, in the case in which the user input manipulating the transparency level is received, the control unit 130 may generate the third image by applying an A (ALPHA) value corresponding to a selected transparency level among the RGBA values of the selected image.

Here, the user input manipulating the transparency level may be performed before the first image is generated, for example, in a process in which the user selects a picture. Alternatively, the user input manipulating the transparency level may be performed after the first image is generated, for example, in a process in which the first image is generated and then displayed on the display unit 110.

In addition, sizes of the generated second and third images may be the same as each other. However, the present invention is not limited thereto.

Meanwhile, the control unit 130 may generate the first image by combining the generated second and third images with each other. Here, the generated first image may be an image in which the second image including only the contour for the selected image and the third image of which a transparency is adjusted by adjusting a color and a contrast of the selected original image are combined with each other.

Meanwhile, a transparency of the contour line described above may also be adjusted. As an example, in the case in which the user input manipulating the transparency level is not separately received, the control unit 130 may generate the contour line so as to correspond to the default transparency level. Alternatively, in the case in which the user input manipulating the transparency level is received, the control unit 130 may generate the contour line so as to correspond to a selected transparency level.

In addition, although the case in which the transparency is adjusted by adjusting the A (ALPHA) value among the RGBA values has been described above, this is only an example, and various methods for adjusting the transparency may be used.

Further, although the case in which the first image is generated by combining the generated second and third images with each other has been described above by way of example, the present invention is not limited thereto. According to another example, the first image may be generated by performing only image processing on the selected image without generating the second and third images. That is, according to another example, the control unit 130 may generate the first image through extraction/generation of a contour line for the selected image and adjustment of a transparency for the selected image. Meanwhile, the control unit 130 may control the display unit 110 to display the generated first image in a state in which the generated first image is overlapped with the photographed image generated through the live-view-photographing of the photographing unit 160. In detail, the control unit 130 may control the display unit 110 to dispose the photographed image generated through the live-view-photographing of the photographing unit 160 at a lower layer and dispose the generated first image at an upper layer to display the photographed image and the generated first image together with each other. Here, the upper layer refers to a layer disposed at an upper portion in relation to a positive (+) direction of a Z axis corresponding to a direction toward which the surface of the display unit 110 is directed, and the lower layer refers to a layer disposed below the upper layer.

However, this is only an example. That is, according to another exemplary embodiment, the control unit 130 may control the display unit 110 to dispose the photographed image generated through the live-view-photographing of the photographing unit 160 at the upper layer and dispose the generated first image at the lower layer to display the photographed image and the generated first image together with each other.

Therefore, a drawing screen in which the 'photographed image' and the 'first image having the contour line and having the adjusted transparency' are overlapped with each other may be displayed on the display unit 110.

Meanwhile, according to an exemplary embodiment of the present invention, the user may set a transparency adjusting target, a transparency level, a size of the first image displayed in a state in which it is overlapped with the photographed image generated through live-view-photographing, and auto-focusing turn-on/off. Here, the transparency adjusting target may include the contour line included in the first image or a region except for the contour line included in the first image.

As an example, the drawing screen displayed on the display unit 110 may include a first region in which the transparency adjusting target is selected, a second region in which the transparency level is selected, and a third region in which an auto-focusing turn-on/off control for photographing is selected.

When the region except for the contour line included in the first image is selected through the first region and the transparency level is adjusted through the second region, the control unit 130 may generate the third image on the basis of the selected transparency level. Therefore, the display unit 110 may display the 'photographed image' and the 'first image having the transparency corresponding to the selected transparency level' together with each other. That is, only the third image may be affected by the selected transparency level, and the second image may not be affected by the selected transparency level.

When the contour line included in the first image is selected through the first region and the transparency level is adjusted through the second region, the control unit 130 may generate the second image on the basis of the selected transparency level. Therefore, the display unit 110 may display the 'photographed image' and the 'first image having the contour line transparency corresponding to the selected transparency level' together with each other. That is, only the second image may be affected by the selected transparency level, and the third image may not be affected by the selected transparency level.

Meanwhile, in a state in which the photographed image through the live-view-photographing of the photographing unit and the first image are displayed together with each other, when a user input performing pinch-in or pinch-out on the displayed screen using two fingers is received, the control unit 130 may control the display unit 110 to enlarge or reduce a size of the first image and display the first image having the enlarged or reduced size. In this case, only the size of the first image may be adjusted or both of sizes of the first image and the photographed image may be enlarged or reduced.

Meanwhile, sizes of the photographed image and the first image may be the same as each other. However, the present invention is not limited thereto. In addition, the first image and the photographed image may be displayed in a state in which they are overlapped with each other on an entire screen of the display unit 110.

Meanwhile, when the 'precision description mode' described above is selected, the control unit 130 may control the display unit 110 to divide the generated first image into a plurality of regions and display the first image divided into the plurality of regions together with the photographed image corresponding to the live-view-photographing of the electronic apparatus. In this case, when one of the plurality of regions is selected, the control unit 130 may control the display unit 110 to enlarge the selected one region and display the enlarged region together with the photographed image corresponding to the live-view-photographing of the electronic apparatus. In addition, the control unit 130 may control the storing unit 140 to store the generated first image. Here, the control unit 130 may control the storing unit 140 to store the generated first image in a folder separate from a folder in which an original image that is an image processing target is stored.

In addition, when an exchange/trade command of the user for the generated first image is received through the input unit 120, the control unit 130 may control the communicating unit 150 to transmit the generated first image to an image exchange/trade server.

As an example, the image exchange/trade server may provide a web for image exchange/trade, a mobile web, a web for a smart phone, or the like. Suppliers may provide and post an original image for free or by fee through the web for image exchange/trade, the mobile web, an application, or the like, and users may directly download an image that they want to view and draw by an apparatus in which an application using the present invention is installed, and generate the first image, thereby viewing and drawing the image. On this web or the mobile web, the suppliers and the users may exchange/trade images that they are to freely view and draw with each other through interactions therebetween. For example, when a person draws a picture well uploads his/her picture onto the web or the mobile web, a person liking the picture to want to view and draw the picture may download the picture from the web or the mobile web.

For the purpose of these actions, the application for implementing various exemplary embodiments of the present invention needs to be installed.

The user needs to basically become a member of a site and possess an electronic apparatus in which the application for implementing various exemplary embodiments of the present invention is installed in order to perform all of these actions.

In addition, the picture supplier may not also possess the electronic apparatus in which the application for implementing various exemplary embodiments of the present invention is installed, needs to go through an identity authentication procedure (his/her own bankbook confirmation, or the like) on the site at the time of registration of sale by fee, and does not need to go through the identity authentication procedure at the time of registration of sale for free. Since the supplier has a commercial right at the time of the registration of the sale by fee, web/mobile web page may have a translucent engraving mark as a protecting apparatus and a mouse right button click and control shift key preventing function as a picture copy preventing function. In addition, at the time of the registration of the sale by fee and payment, micropayment through a credit card or cellular phone authentication is possible, a subject of the image exchange/trade server providing the web/mobile web may automatically collect a predetermined commission and then remit sale money to an account of the supplier. Official announcement may be included in clauses and commission guidance with respect to these comprehensive various matters. All of the functions described above, such as category adjustment, comments, official announcement functions, and the like, of the web/mobile web may be controlled in a separate manager page.

Meanwhile, the user may input a phone number of a smart phone in which the image that he/she wants to view and draw will be downloaded and then download the image.

According to various exemplary embodiments of the present invention described above, the user may easily view and draw the displayed picture on a medium such as a paper while viewing the displayed screen. That is, the user may obtain an effect felt as if he/she views and draws the picture using a transparent film or an oilpaper through the electronic apparatus.

Figure 2:
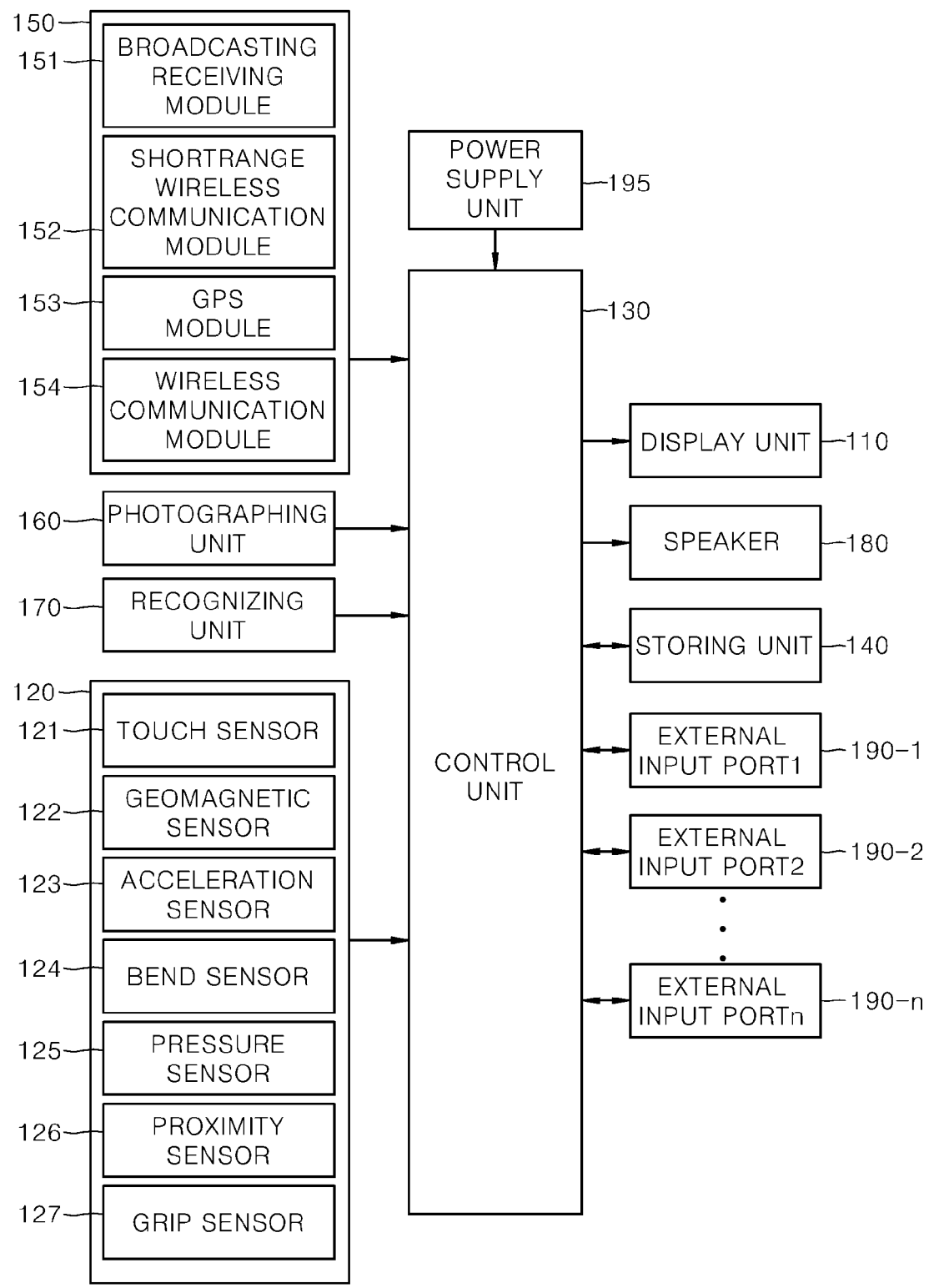
FIG. 2 is a block diagram illustrating the electronic apparatus of FIG. 1 in detail.

FIG. 2 is a block diagram illustrating the electronic apparatus of FIG. 1 in detail. Referring to FIG. 2, the electronic apparatus 100 includes all or some of the display unit 110, the input unit 120, the control unit 130, the storing unit 140, the communicating unit 150, the photographing unit 160, a recognizing unit 170, a speaker 180, external input ports 190-1 to 190-n, and a power supply unit 195. Hereinafter, an overlapped description for the components described above with reference to FIG. 1 will be omitted, and the electronic apparatus according to an exemplary embodiment of the present invention will be described in more detail with reference to FIG. 2.

The input unit 120 receives a user manipulation for the electronic apparatus 100. Here, the input unit 120 may include all or some of various types of sensors such as a touch sensor 121, a geomagnetic sensor 122, an acceleration sensor 123, a bend sensor 124, a pressure sensor 125, a proximity sensor 126, a grip sensor 127, and the like.

The touch sensor 121 may be implemented by a capacitive touch sensor or a resistive touch sensor. The capacitive touch sensor uses a scheme of calculating a touch coordinate by sensing micro electricity excited to a body of the user when a portion of the body of the user touches the surface of the display unit 110, using a dielectric material coated on the surface of the display unit 110. The resistive touch sensor includes two electrode plates and uses a scheme of calculating a touch coordinate by sensing a current flowing due to a contact between upper and lower electrode plates at a touch point in the case in which the user touches a screen. As described above, the touch sensor 121 may be implemented in various forms.

The geomagnetic sensor 122 is a sensor for sensing a rotation state, a movement direction, and the like, of the electronic apparatus 100, and the acceleration sensor 123 is a sensor for sensing an inclined level of the electronic apparatus 100. The geomagnetic sensor 122 and the acceleration sensor 123 may also be used to detect a rotation state, a gradient state, or the like, of the electronic apparatus 100.

The bend sensor 124, which is a sensor required in the case in which the electronic apparatus 100 is implemented as a flexible display apparatus, may sense a bent state of the electronic apparatus 100.

The pressure sensor 125 senses a magnitude of pressure applied to the electronic apparatus 100 when the user performs a touch or bending manipulation, and provides the magnitude of the pressure to the control unit 130. The pressure sensor 125 may include a piezo film embedded in the display unit 110 to output an electrical signal corresponding to the magnitude of the pressure. Although the pressure sensor 125 and the touch sensor 121 have been illustrated as separate sensors in FIG. 2, in the case in which the touch sensor 121 is implemented as the resistive touch sensor, the resistive touch sensor may also serve as the pressure sensor 125.

The proximity sensor 126 is a sensor for sensing a motion of approaching the display unit 110 without directly contacting the surface of the display unit. The proximity sensor 126 may be implemented by various types of sensors such as a high frequency oscillation type proximity sensor forming a high frequency magnetic field to sense a current induced by magnetic field characteristics changed at the time of approaching an object, a magnetic proximity sensor using a magnet, and a capacitive proximity sensor sensing a capacitance changed due to approach of a target.

The grip sensor 127 is a sensor disposed at an edge or knob portion of the electronic apparatus 100 separately from the pressure sensor 125 to sense a grip of the user. The grip sensor 127 may be implemented as a pressures sensor or a touch sensor.

The control unit 130 analyzes various sensed signals sensed in the input unit 120 to figure out an intention of the user and perform an operation in accordance with the intention. As an example, the control unit 130 may perform an operation of processing data obtained through communication with the external apparatus or data stored in the storing unit 140 and outputting the processed data through the display unit 110, the speaker 180, and the like. In this case, the control unit 130 may perform the communication with the external apparatus using the communicating unit 150.

The communicating unit 150 is a component performing communication with various types of external apparatuses in various types of communication schemes. The communicating unit 150 may include all or some of various communication modules such as a broadcasting receiving module 151, a short range wireless communication module 152, a global positioning system (GPS) module 153, a wireless communication module 154, and the like. Here, the broadcasting receiving module 151 may include a terrestrial broadcasting receiving module (not illustrated) including an antenna, a demodulator, an equalizer, and the like, for receiving a terrestrial broadcasting signal, a digital multimedia broadcasting (DMB) module for receiving and processing a DMB broadcasting signal, or the like. The short range wireless communication module 152 is a module performing communication with an external apparatus positioned at a short distance in a short range wireless communication scheme such as an NFC scheme, a Bluetooth scheme, a ZigBee scheme, or the like. The GPS module 153 is a module for receiving a GPS signal from a GPS satellite to detect a current position of the electronic apparatus 100. The wireless communication module 154 is a module connected to an external network according to a wireless communication protocol such as WiFi, IEEE, or the like, to perform communication. In addition, the communication module 152 may further include a mobile communication module accessing a mobile communication network according to various mobile communication protocols such as 3rd generation (3G), 3rd generation partnership project (3GPP), long term evolution (LTE), and the like, to perform communication.

The control unit 130 may selectively activate components required for performing an operation intended by the user among the respective components of the communicating unit 150 described above to perform the operation.

Meanwhile, the control unit 130 may recognize a speech input or a motion input in addition to the bending manipulation or the touch manipulation and perform an operation corresponding to this input. In this case, the control unit 130 may activate the recognizing unit 170.

The speech recognizing unit 170 collects a speech of the user or an external sound using a speech acquiring means such as a microphone (not illustrated), and then transfers the speech or the sound to the control unit 130. In the case in which the control unit 130 is operated in a speech control mode, when the speech of the user coincides with a preset speech command, the control unit 130 may perform a task corresponding to the speech of the user. As a task that may be controlled using the speech, there may be various tasks such as volume adjustment, channel selection, channel zapping, display attribute adjustment, play, pause, rewinding, fast winding, application execution, menu selection, apparatus turn-on, apparatus turn-off, and the like.

Meanwhile, the motion recognizing unit 170 obtains an image of the user using an image photographing means (not illustrated) such as a camera, and then provides the image to the control unit 130. In the case in which the control unit 130 is operated in a motion control mode, the control unit 130 analyzes an image of the user, and performs an operation corresponding to a motion gesture when it is decided that the user takes the motion gesture corresponding to a preset motion command. As an example, various tasks such as channel zapping, apparatus turn-on, apparatus turn-off, pause, play, stop, rewinding, fast winding, muting, and the like, may be controlled by a motion. The above-mentioned examples for the tasks that may be controlled by the speech, and the tasks that may be controlled by the motion, and the like, are only examples, and are not limited thereto.

In addition, the external input ports 1 to n 190-1 to 190-n may be connected to various types of external apparatuses, respectively, to receive various data, programs, control commands, or the like. In detail, the external input ports may include a USB port, a headset port, a mouse port, a local area network (LAN) port, and the like.

The power supply unit 195 is a component supplying power to the respective components of the electronic apparatus 100.

Hereinafter, scenarios of a method of controlling an electronic apparatus according to an exemplary embodiment of the present invention will be described on the basis of user interface (UI) screens 301 with reference to FIGS. 3 to 9.

Figure 3:
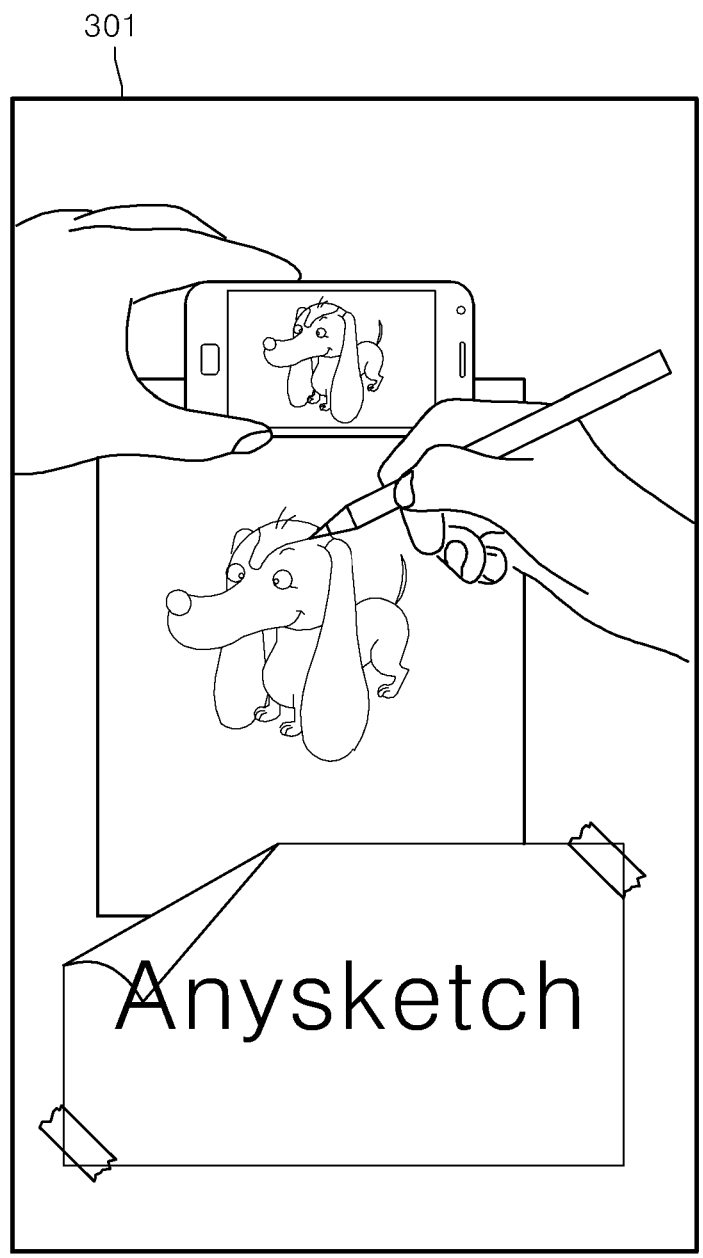
FIGS. 3 to 8 are views illustrating examples of user interface (UI) screens for describing a method of controlling an electronic apparatus according to an exemplary embodiment of the present invention.
Figure 4:
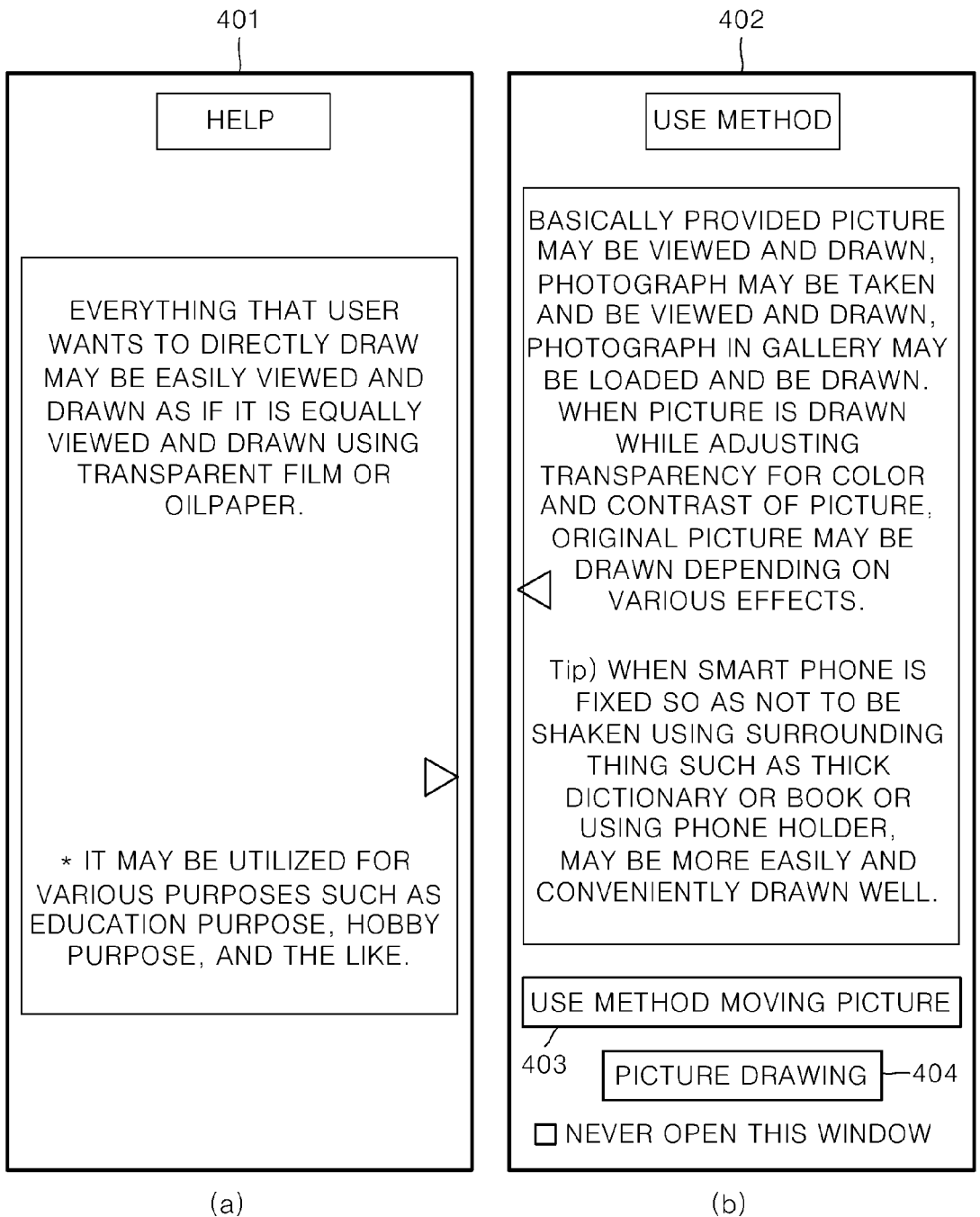

When an application is executed, the display unit 110 may first display an initial driving screen as illustrated in FIG. 3. Therefore, the user may intuitively recognize that the executed application is the picture viewing and drawing application.

In addition, the display unit 110 may display a help screen 401 indicating a use purpose as illustrated in FIG. 4A. In addition, when an arrow for moving to the next screen is selected, the display unit 110 may display a help screen 402 indicating a use method as illustrated in FIG. 4B. Here, the help screen 402 indicating the use method may display a method that may more conveniently and usefully use a program using letters and visual data (moving picture). As an example, when a 'use method moving picture menu 403' is selected, a moving picture for describing a use method may be directly played (automatic return to the application at the time of pressing a back button).

Meanwhile, when a 'picture drawing menu 404' is selected, the help screen proceeds to a screen in which a plurality of drawing modes may be selected.

The help screens as illustrated FIGS. 4A and 4B may directly proceed to the screen in which the plurality of drawing modes may be selected without being displayed at the time of executing the application later in the case in which 'never opening this window' is clicked.

Figure 5:
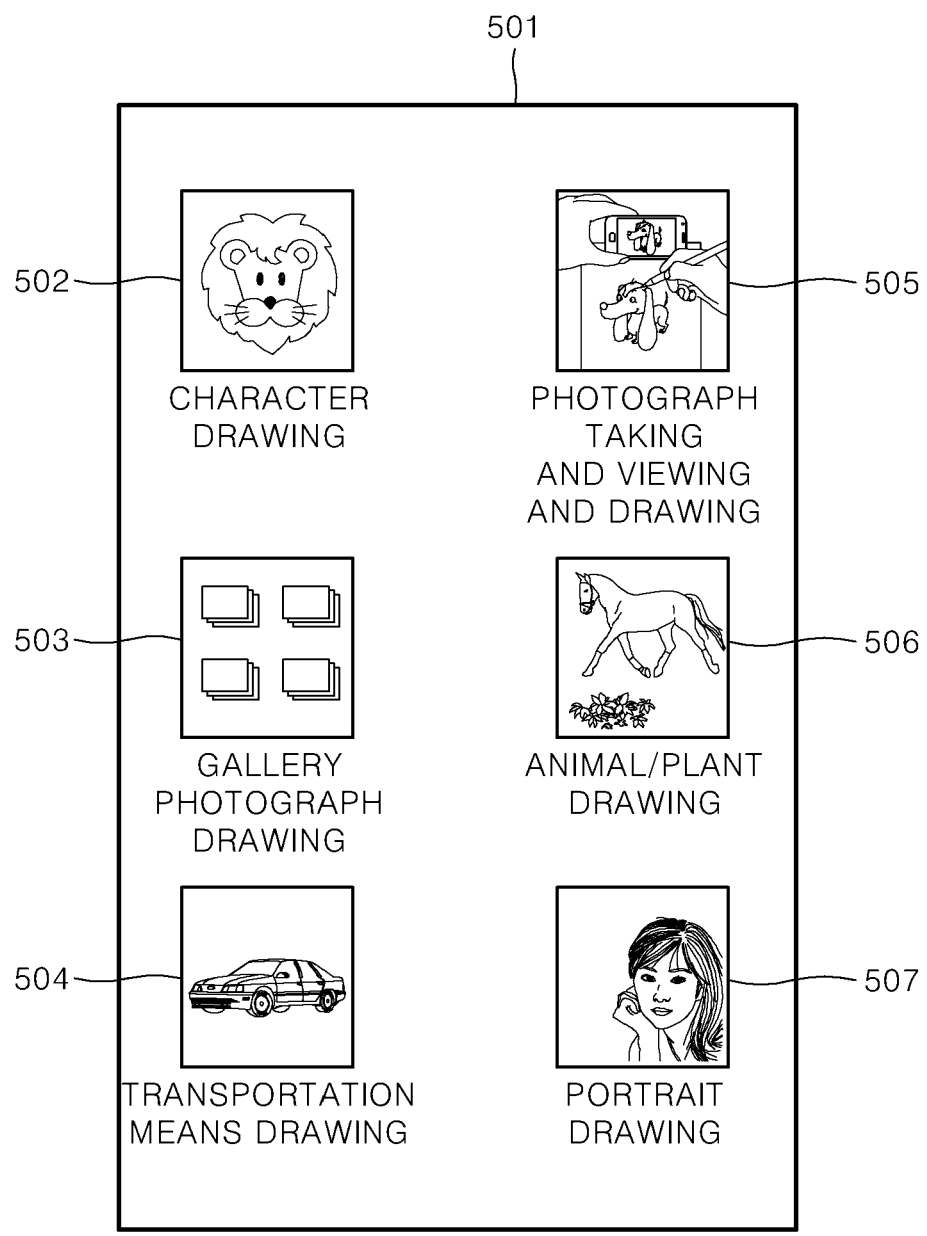

Then, the display unit 110 may display the screen 501 in which the plurality of drawing modes may be selected as illustrated in FIG. 5. Here, the screen in which the plurality of drawing modes may be selected may include the plurality of drawing modes that may be selected by the user. The drawing mode may include at least one of a 'character drawing mode 502', a 'photograph taking and viewing and drawing mode 505', a 'gallery photograph drawing mode 503', an 'animal/plant drawing mode 506', a 'transportation means drawing mode 504', a 'portrait drawing mode 507', and a 'precision description mode'.

Figure 6:
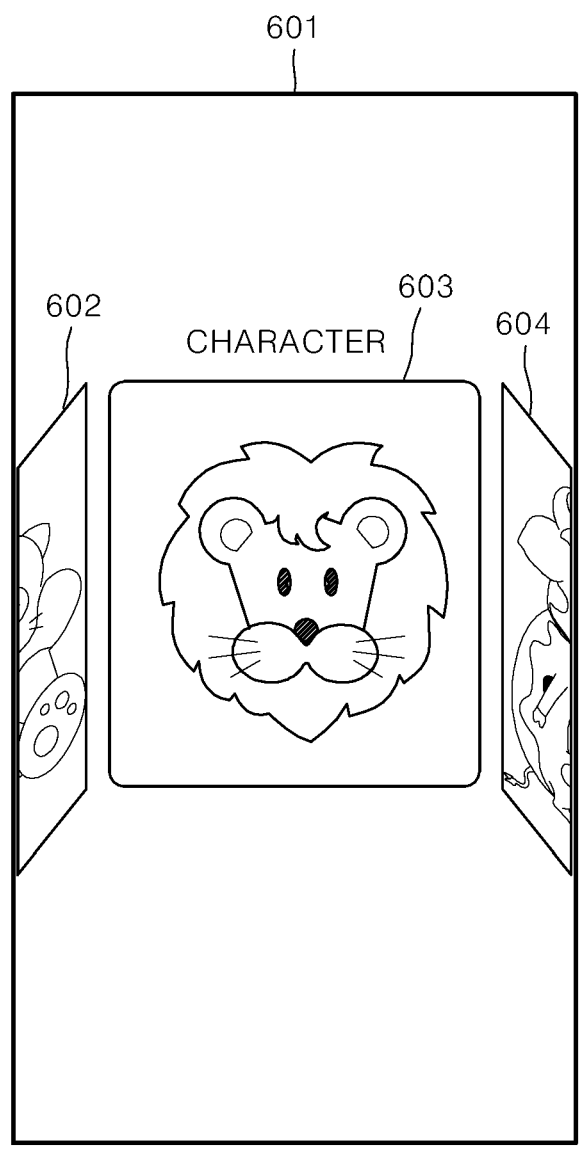

When the 'character drawing mode 502' is selected, the screen 501 may proceed to a screen for selecting various character images having a copyright and a screen for drawing the selected character image. As an example, as illustrated in FIG. 6, a screen 601 on which characters 602, 603, and 604 that the user wants to draw may be selected by a slide show in a horizontal direction may be displayed.

When the 'photograph taking and viewing and drawing mode 505' is selected, the photographing unit 160 is driven to take a photograph, and the screen 501 may proceed to a screen for drawing the photographed image.

When the 'gallery photograph drawing mode 503' is selected, the screen 501 may proceed to a screen for selecting an image in a gallery and a screen for drawing the selected image.

When the 'animal/plant drawing mode 506' is selected, the screen 501 may proceed to a screen for selecting an animal/plant image and a screen for drawing the selected image.

When the 'transportation means drawing mode 504' is selected, the screen 501 may proceed to a screen for selecting a transportation means image and a screen for drawing the selected image.

When the 'portrait drawing mode 507' is selected, the screen 501 may proceed to a screen for selecting a portrait image and a screen for drawing the selected image.

When the 'precision description mode' is selected, the screen 501 may proceed to a screen for selecting an image to be precisely described and a screen for drawing the selected image.

Here, the drawing screen may be a screen displayed on the display unit 110 in a state in which the 'photographed image corresponding to the live-view-photographing' and the first image having the contour line and the adjusted transparency for the selected image are overlapped with each other. This drawing screen will be described in detail with reference to FIG. 7.

When it is assumed that the photographing unit 160 is live-view-photographing a white paper, the display unit 110 may display a drawing screen 703 as illustrated in FIG. 7A or 7B. That is, the drawing screen may display a 'photographed image 704 corresponding to the photographing of the white paper' and a 'first image 705 or 706 having a contour line and an adjusted transparency for a selected image together with each other.

Meanwhile, the drawing screen may include a first region 707 in which a transparency adjusting target is selected, a second region 702 in which a transparency level is selected, and a third region 701 in which an auto-focusing turn-on/off control for the photographing is selected. Here, the first region 707 may include a region 707-1 in which the contour line is selected as the transparency adjusting target and a second region 707-2 in which a region except for the contour line is selected as the transparency adjusting target.

When the region except for the contour line included in the first image is selected through the first region 707 and the transparency level is selected through the second region 702, the control unit 130 may generate the third image on the basis of the selected transparency level. Therefore, as illustrated in FIGS. 7A and 7B, the display unit 110 may display the 'photographed image 704' and the 'first image 705 or 706 having the contour line and having the transparency corresponding to the selected transparency level' together with each other.

As an example, as illustrated in FIG. 7B, when the transparency level is 0%, the first image 706 in which only the contour line clearly remains may be displayed together with the photographed image 704 on the display unit 110.

As illustrated in FIG. 7A, when the transparency level is 100%, the first image 705 having the 'contour' and having a color and a contrast of an original image of which a transparency is not adjusted may be displayed together with the photographed image 704 on the display unit 110.

Figure 7:
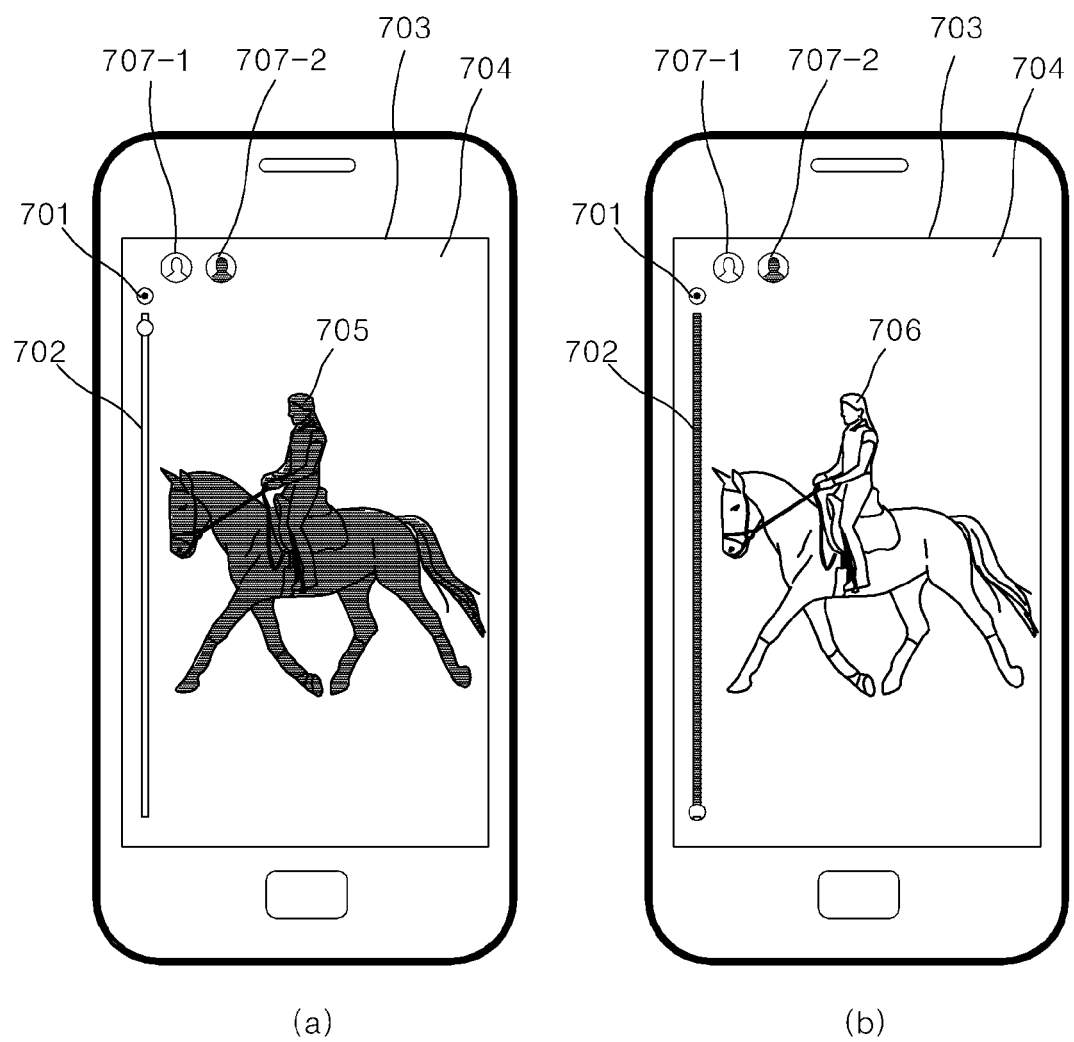
Figure 8:
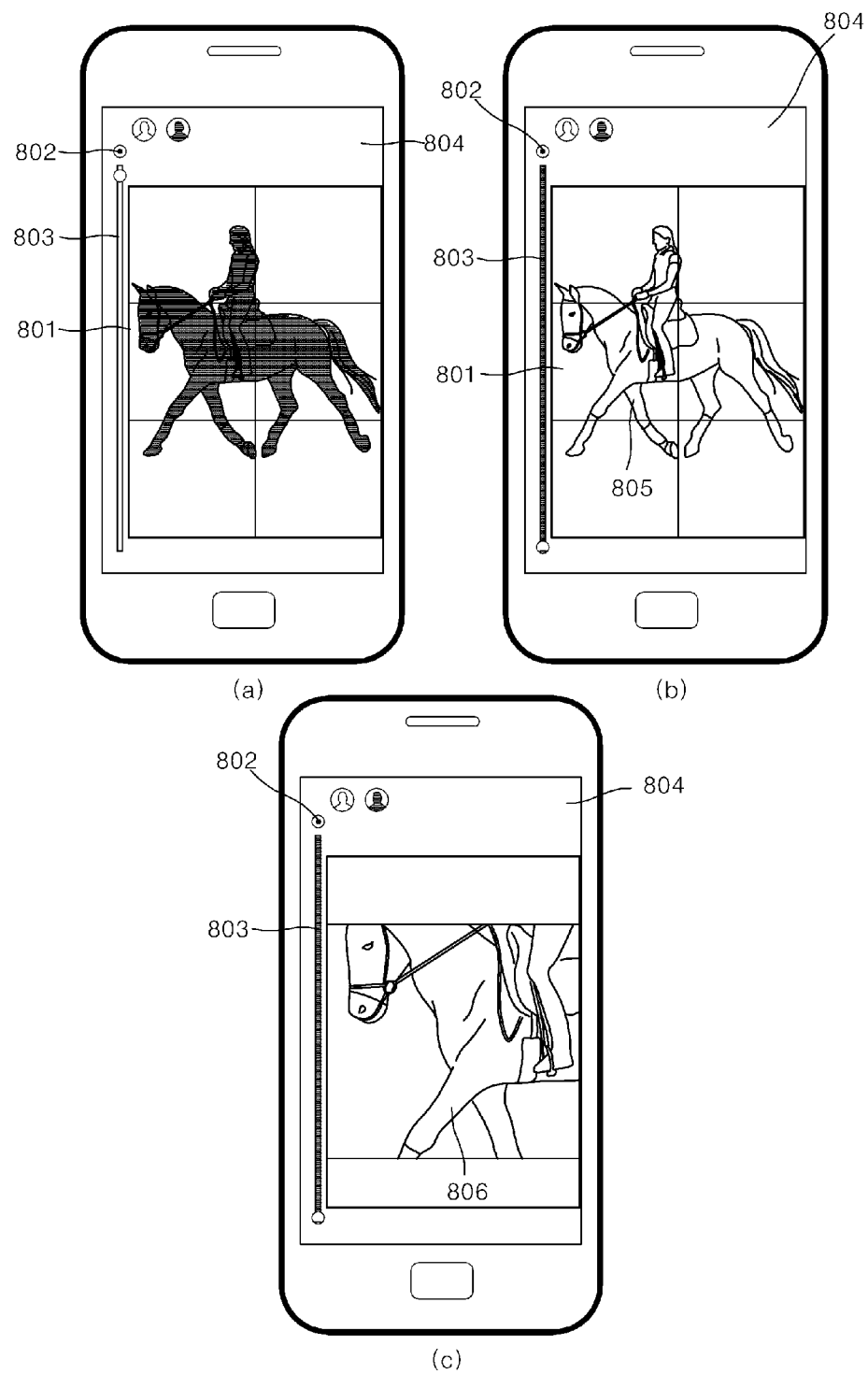

Meanwhile, although not illustrated in FIG. 7, when the transparency level is 50%, a first image having a contour in a clear state and having a transparency corresponding to 50% of that of the original image may be displayed together with the photographed image on the display unit 110.

Meanwhile, an auto-focusing function of the photographing unit 160 may be a setback in some situations. That is, although the user views the screen in a state in which the auto-focusing function is activated, the case in which a focus is made on a hand, a pen, or the like, drawing a picture on a medium such as a paper due to the auto-focusing function may occasionally occur. In this case, since the auto-focusing function may be a factor hindering the user from drawing the picture on the medium such as the paper, the auto-focusing turn-on/off control is selected by the user, thereby making it possible to prevent the factor.

Meanwhile, when the 'precision description mode' described above is selected, the display unit 110 may divide a first image 801 into a plurality of regions and display the first image 801 divided into the plurality of regions together with a photographed image 804 corresponding to the live-view-photographing of the electronic apparatus, as illustrated in FIGS. 8A and 8B. When one 805 of the plurality of regions is selected as illustrated in FIG. 8B, the display unit 110 may enlarge the selected one region 805 and display the enlarged region 806 in a state in which the enlarged region 806 is overlapped with the photographed image 804 corresponding to the live-view-photographing of the electronic apparatus, as illustrated in FIG. 8C. Therefore, the user may draw one region of the image that he/she will view and draw in more detail on the medium such as the paper.

Meanwhile, although an example in which the selected region is enlarged and displayed in the case in which the 'precision description mode' described above is selected has been described in FIG. 8, the present invention is not limited thereto. As another example, in a state in which the photographed image through the live-view-photographing of the photographing unit and the first image are displayed together with each other, the user may perform a pinch-in or pinch-out input on the displayed screen using two fingers. In this case, the first image may be enlarged or reduced. Alternatively, both of the first image and the photographed image may be enlarged or reduced.

Figure 9:
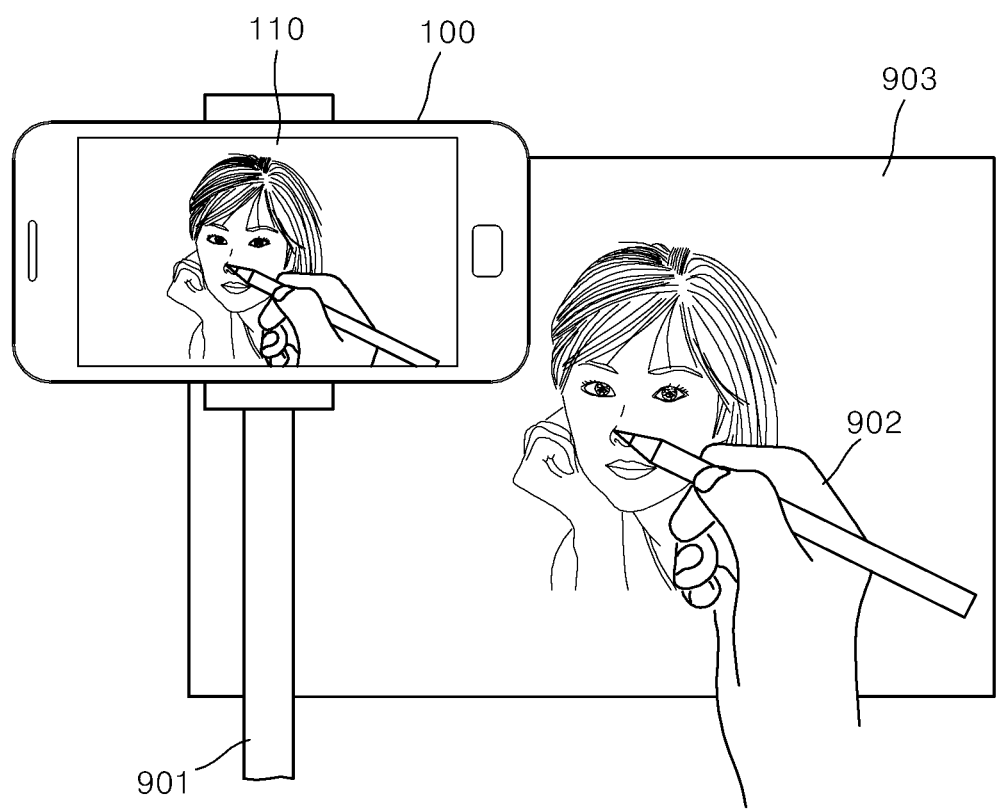
FIG. 9 is a view illustrating an example of a method of viewing and drawing a picture using the electronic apparatus according to an exemplary embodiment of the present invention.

FIG. 9 is a view illustrating an example of a method of viewing and drawing a picture using the electronic apparatus according to an exemplary embodiment of the present invention. Referring to FIG. 9, the display unit 110 of the electronic apparatus 100 may display a drawing screen in which a 'photographed image' photographed by live-view-photographing a 'hand 902 drawing a picture' and a 'paper 903 on which the user views and draws the picture while viewing a screen of the display unit 110' and a 'first image having a contour line and having an adjusted transparency' are overlapped with each other. In this case, in order to precisely photograph a form in which the user views and draws the picture, the picture may be drawn in a state in which the electronic apparatus 100 is fixed by a fixing apparatus 901.

Therefore, the user may easily view and draw the picture on a medium such as the paper 903 while viewing the screen displayed on the display unit 110. That is, the user may obtain an effect felt as if he/she views and draws the picture using a transparent film or an oilpaper through the electronic apparatus.

Figure 10:
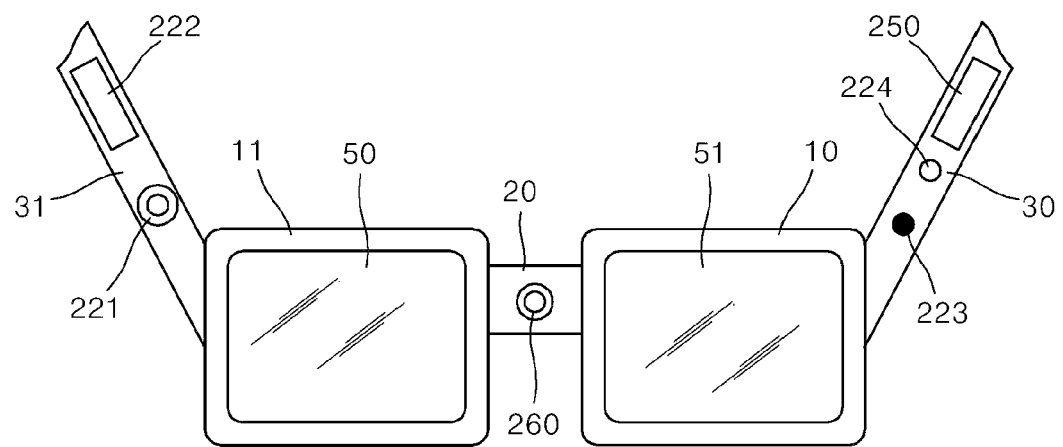
FIG. 10 is a view illustrating an example in which the electronic apparatus according to an exemplary embodiment of the present invention is implemented as a smart glasses.

FIG. 10 is a view illustrating an example in which the electronic apparatus according to an exemplary embodiment of the present invention is implemented as a wearable electronic apparatus. The illustrated wearable electronic apparatus 200 may be manufactured in a glasses form so as to be positioned adjacently to eyes of the user, and may include all or some of functional block components performing the functions described above in FIGS. 1 and 2. Hereinafter, a detailed description for the contents described in FIGS. 1 and 2 will be omitted, and features according to a form of the wearable electronic apparatus worn adjacently to the eyes of the user will be applied to various exemplary embodiments and the present invention and will be described in detail. Here, the wearable electronic apparatus 200 may be implemented by various apparatuses such as a smart glasses, a project glasses, and the like, worn adjacently to the eyes of the user.

Referring to FIG. 10 illustrating a shape of the wearable electronic apparatus 200 viewed in the front, the wearable electronic apparatus 200 according to an exemplary embodiment of the present invention may be configured to include left and right lens frames 10 and 11, a frame connecting part 20, left and right side-arms 30 and 31, and left and right lenses 50 and 51.

Meanwhile, a photographing unit 260 that may photograph a photograph or a moving picture may be mounted on a front surface of the wearable electronic apparatus 200. For example, the photographing unit 260 may be disposed on a front surface of the frame connecting part 20, as illustrated in FIG. 10.

Therefore, the user may photograph the photograph or the moving picture using the photographing unit 260 and store and share the photograph or the moving picture, while moving in a state in which he/she wears the wearable electronic apparatus 200 having a glasses form.

In this case, there is an advantage that a viewpoint of an image photographed by the photographing unit 260 may be very similar to a viewpoint of a scene recognized by vision of the user.

In addition, a gesture such as a hand gesture of the user, or the like, may be recognized using the photographing unit 260, and an operation or a function of the wearable electronic apparatus 200 may be controlled depending on the recognized gesture.

A position at which the photographing unit 260 is mounted or the number of photographing units 260 may be changed as needed, and a special purpose camera such as an infrared camera, or the like, may also be used.

In addition, units for performing specific functions may be disposed on each of the left and right side-arms 30 and 31.

Input units 220 receiving a user input for controlling a function of the wearable electronic apparatus 200 may be mounted on the right side-arm 31.

For example, a track ball 221 or a touch pad 222 for selecting or moving an object such as a cursor, a menu item, or the like, on a screen may be disposed on the right side-arm 31.

The input units 220 included in the wearable electronic apparatus 200 are not limited to the track ball 221 and the touch pad 222. That is, various input apparatuses such as a key pad, a dome switch, a jog wheel, a jog switch, and the like, may be included in the wearable electronic apparatus 200.

Meanwhile, a microphone 223 may be mounted on the left side-arm 30, and the operation or the function of the wearable electronic apparatus 200 may be controlled using a speech of the user recognized through the microphone 223.

In addition, a sensing unit 224 may be disposed on the right side-arm 30, and may sense information, and the like, related to a current state or the user such as a position of the wearable electronic apparatus 200, whether or not the user contacts the wearable electronic apparatus 200, an orientation of the wearable electronic apparatus 200, acceleration/deceleration of the wearable electronic apparatus 200, and the like, to generate a sensed signal for controlling the operation of the wearable electronic apparatus 200.

For example, the sensing unit 224 may include a motion sensor such as a gyroscope, an accelerometer, or the like, a position sensor such as a GPS apparatus, a magnetometer, a direction sensor such as a theodolite, a temperature sensor, a humidity sensor, an anemometer, and the like. However, the present invention is not limited thereto. That is, the sensing unit 224 may further include sensors that may detect various information in addition to the sensors described above.

For example, the sensing unit 224 may further include an infrared sensor. The infrared sensor may be configured to include a light emitting unit emitting an infrared ray and a light receiving unit receiving the infrared ray to thereby be used for infrared communication, measurement of proximity, or the like.

The wearable electronic apparatus 200 according to an exemplary embodiment of the present invention may include a communicating unit 250 for communication with an external apparatus.

For example, the communicating unit 250 may include a broadcasting receiving module, a mobile communication module, a wireless Internet module, a short range communication module, and the like.

In addition, the wearable electronic apparatus 200 according to an exemplary embodiment of the present invention may include a display apparatus displaying an image to transfer visual information to the user.

In order to allow the user to view a front view opened in front of him/her together with information displayed by the display apparatus, the display apparatus may be configured to include a transparent or light-transmitting unit.

For example, at least one of the left and right lenses 50 and 51 illustrated in FIG. 10 serves as a function of the transparent display as described above, such that the user may view the front view while visually recognizing a text, an image, or the like, formed on the lens.

To this end, the wearable electronic apparatus 200 may display various information in front of eyes of the user using a display apparatus such as a head mounted display (HMD), a head up display (HUD), a prism project display, or the like.

The HMD is configured to include a lens enlarging an image to form a virtual image and a display panel disposed at a position closer than a focal length of the lens. When the HMD is mounted in the vicinity of a head of the user, the user views the image displayed on the display panel through the lens, thereby making it possible to visually recognize the virtual image.

Meanwhile, in the HUD, the image displayed on the display panel is enlarged through the lens, the enlarged image is reflected on a half mirror, and the reflected light is viewed to the user, such that a virtual image is formed. In addition, since the half mirror is configured to transmit external light therethrough, the user may view the front view together with the virtual image formed by the HUD by external light transmitted through the half mirror.

In addition, the display apparatus may be implemented using various transparent display schemes such as a transparent organic light emitting diode (TOLED).

Meanwhile, in the prism project display, a beam of a mini projector is reflected on a plate in a prism and then enters the eye of a wearer, this light is collected on a macula lutea of the retina in the eye, and the optic nerve transfers this visual information to the brain, such that the user may view the image displayed by the prism project display together with the front view. The wearable electronic apparatus using the prism project display may be a project glasses. In this case, the wearable electronic apparatus may not include a separate lens unit, unlike FIG. 10 described above.

Hereinafter, although an exemplary embodiment of the present invention will be described with reference to an example in which the wearable electronic apparatus 200 includes the HUD, the present invention is not limited thereto.

The HUD performing a function similar to a projector may be mounted on a rear surface of at least one of the left side-arm 30 and the right-side arm 31.

Since an image by light emitted from the HUD is reflected on the left and right lenses 50 and 51 and is then viewed to the user, the user may recognize as if an object formed by the HUD is displayed on the left and right lenses 50 and 51.

Meanwhile, unlike FIG. 10, the wearable electronic apparatus 200 includes only any one (for example, the right lens 51) of the left and right lenses, thereby making it possible to allow the image displayed on the display apparatus in the wearable electronic apparatus 200, such as the HUD, or the like, to be viewed in only one eye.

In addition, the wearable electronic apparatus 200 may also be implemented in a structure in which one (for example, a left eye) of the eyes of the user is completely opened without being covered by the lens and only a portion of an upper side of the other (for example, a right eye) of the eyes of the user is covered by the lens 11.

A shape, a configuration, and the like, of the wearable electronic apparatus 200 as described above may be selected or modified depending on various needs such as a use field, a main function, a main user class, and the like.

Meanwhile, this display apparatus may perform a function of the display unit 110 illustrated in FIGS. 1 to 9. However, when the smart glasses 200 is used, the live-view-photographing operation of the photographing unit 260 described above in FIGS. 1 and 2 does not need to be performed (that is, the photographed image does not need to be displayed) due to characteristics of the smart glasses 200 that may be worn by the user to allow the user to view the front view opened in front of the eyes of him/her. That is, the display apparatus such as the HUD displays a 'transparent first image having the contour' generated by combining the second and third images described above with each other, such that the wearer may view the front view opened in front of the eyes of him/her together with information displayed by the display apparatus. In this case, the wearer may recognize as if a screen similar to the screen displayed on the display unit 110 of FIG. 9 is displayed on the lenses 50 and 51.

Therefore, the user may more easily view and draw the picture on the medium such as the paper while viewing the screen on the smart glasses or the project glasses. That is, in a case of viewing and drawing the photographed image through the live-view-photographing in the electronic apparatus such as a smart phone, a delay between actual movement of a hand and movement of the hand viewed on a screen through the photographing is generated. However, in the smart glasses or the project glasses, since the actual movement of the hand and the first image are simultaneously viewed, this disadvantage may be completely supplemented.

That is, in the case of using an apparatus in which the camera is driven to display the first image on a live view screen and view and draw the picture, such as the smart phone, a fine delay between the actual movement of the hand and the movement of the hand on the live view screen is generated. However, the smart glasses or the project glasses is operated while using the HUD, the HMD, a prism project, a prism display, and various display apparatus defined above, and an actual scene (an image of the front view opened in front of the eyes of the user) rather than a live view of the camera and the first image are viewed together with each other. Therefore, the user views and draws the first image while directly viewing actual his/her hand, such that a delay is not generated in the live view.

In addition, in order to use an apparatus such as a smart phone or a digital camera in which the application of the present invention is installed, the apparatus needs to be mounted at any place so as to be fixed, which is inconvenient. However, the smart glasses or the project glasses is basically mounted in front of the eyes of the user and is naturally fixed, which is advantageous.

Meanwhile, according to an exemplary embodiment of the present invention, in the case in which the electronic apparatus 100 moves due to a manipulation of the user, only the photographed image may be changed into a photographed image corresponding to the live-view-photographing and be then displayed in a state in which the first image displayed on the display unit 110 is fixed. That is, since the 'first image having the contour line and the adjusted transparency' is the image that the user wants to view and draw, it may be fixed on the screen of the display unit 110 of the electronic apparatus 100. However, since the photographed image is the image through the live-view-photographing, an image photographed in real time in the photographing unit may be changed depending on movement of the electronic apparatus 100. Therefore, the image photographed in real time in the photographing unit may be changed into the photographed image corresponding to the live-view-photographing and be then displayed.

However, this is only an example of the present invention. That is, according to implementations, in the case in which the electronic apparatus 100 moves depending on a manipulation of the user, the first image may move and be displayed so as to correspond to the movement of the electronic apparatus 100.

Figure 11:
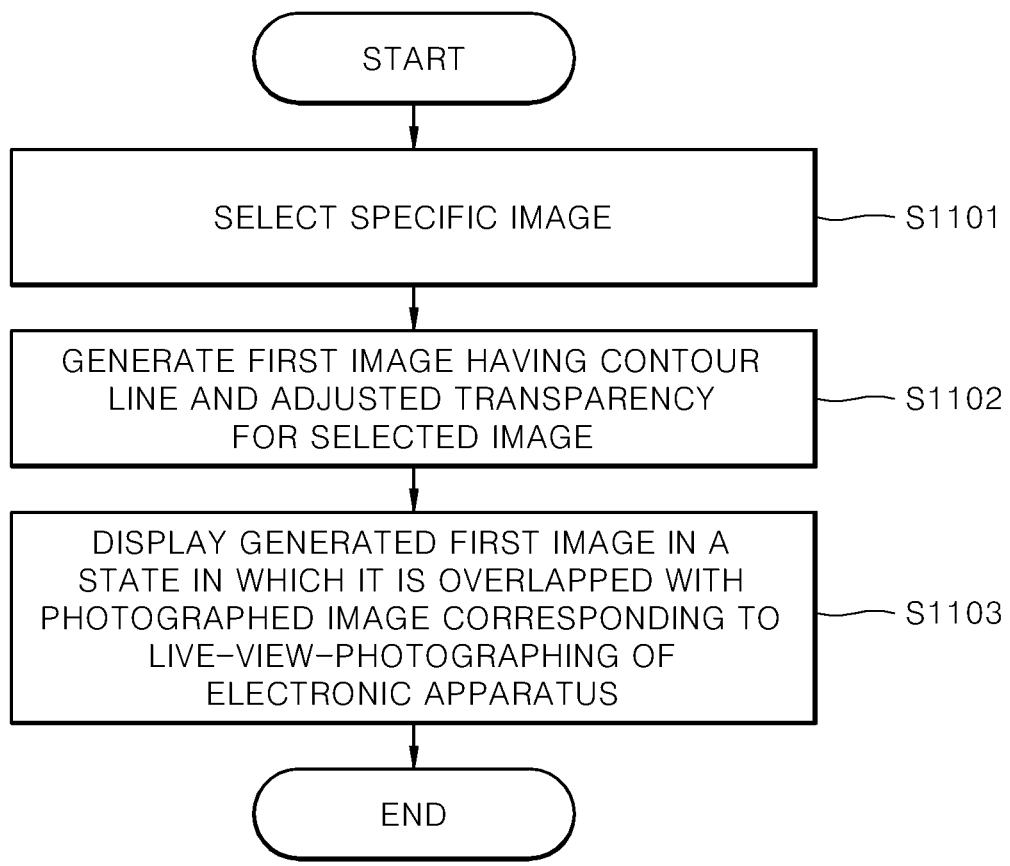
FIG. 11 is a flow chart for describing the method of controlling an electronic apparatus according to an exemplary embodiment of the present invention.

FIG. 11 is a flow chart for describing the method of controlling an electronic apparatus according to an exemplary embodiment of the present invention. Referring to FIG. 11, a specific image may be first selected (S1101).

In addition, the first image having the contour line and the adjusted transparency for the selected image may be generated (S1102).

In addition, the generated first image may be displayed in a state in which it is overlapped with the photographed image corresponding to the live-view-photographing of the electronic apparatus (S1103).

Here, an example of generating the first image will be described in detail with reference to FIG. 12.

Figure 12:
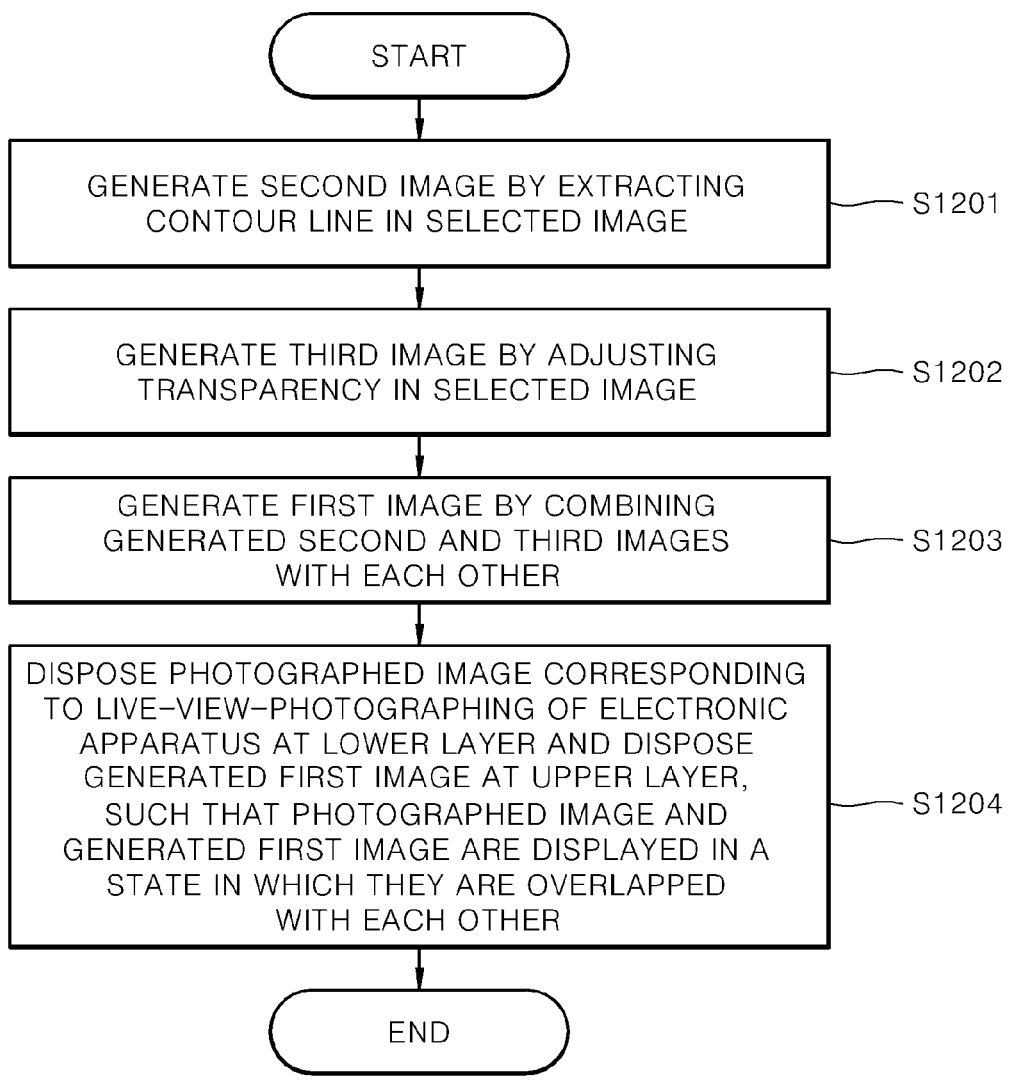
FIG. 12 is a flow chart for describing a method of generating a first image having a contour line and an adjusted transparency according to an exemplary embodiment of the present invention.

FIG. 12 is a flow chart for describing a method of generating a first image having a contour line and an adjusted transparency according to an exemplary embodiment of the present invention. Referring to FIG. 12, first, the second image may be generated by extracting the contour line in the selected image (S1201).

In addition, the third image may be generated by adjusting the transparency in the selected image (S1202).

In addition, the first image may be generated by combining the generated second and third images with each other (S1203).

Meanwhile, in the displaying (S1103), the photographed image corresponding to the live-view-photographing of the electronic apparatus may be disposed at the lower layer, and the generated first image may be disposed at the upper layer, such that the photographed image and the generated first image may be displayed in a state in which they are overlapped with each other (S1204).

Meanwhile, in the displaying (S1204), a screen further including the first region in which the transparency adjusting target is selected, the second region in which the transparency level is selected, and the third region in which the auto-focusing turn-on/off control for the photographing is selected may be displayed. In this case, in the generating (S1202) of the third image, the first image may be generated on the basis of the transparency adjusting target selected in the first region and the transparency level selected in the second region. Hereinafter, the case in which the region except for the contour line is selected as the transparency adjusting target will be described in detail with reference to FIG. 13.

Figure 13:
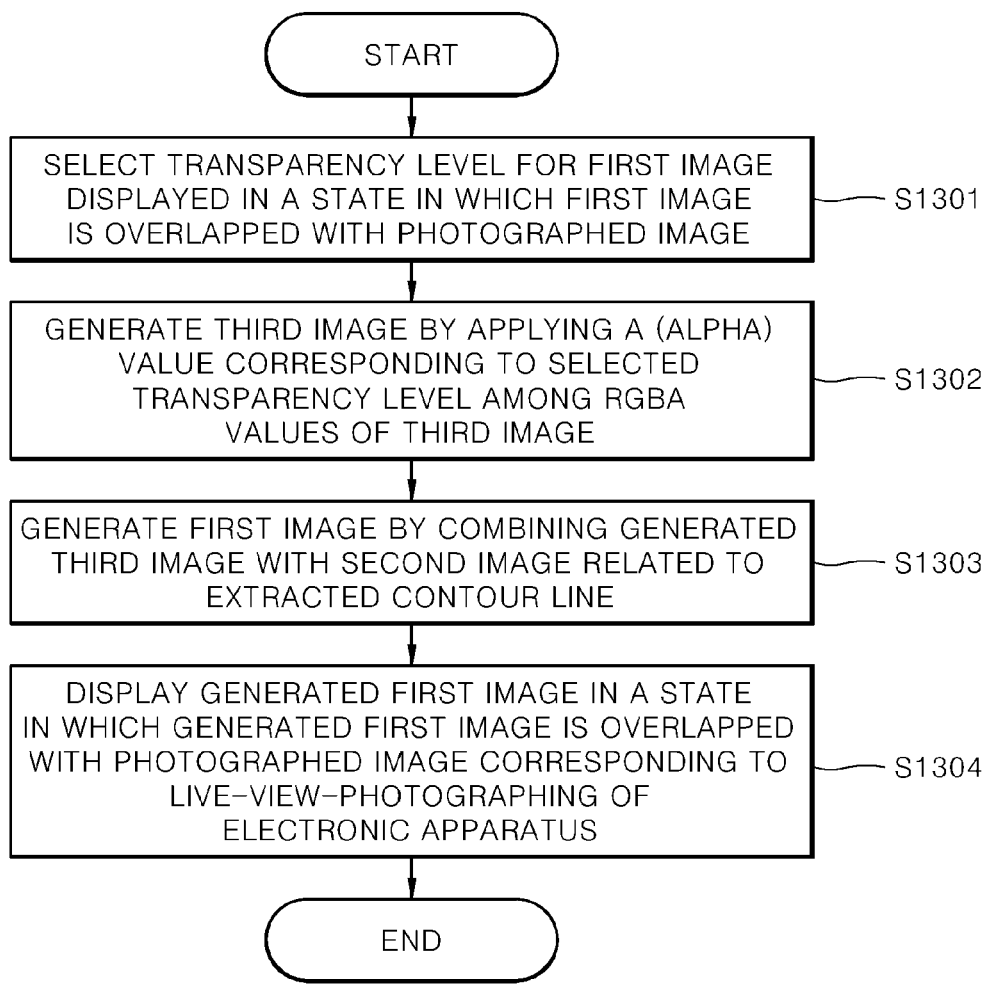
FIG. 13 is a flow chart for describing a method of generating a first image having a contour line and an adjusted transparency according to an exemplary embodiment of the present invention.

FIG. 13 is a flow chart for describing a method of generating a first image having a contour line and an adjusted transparency according to an exemplary embodiment of the present invention. Referring to FIG. 13, first, the transparency level for the first image displayed in a state in which the first image is overlapped with the photographed image corresponding to the live-view-photographing may be selected through the second region (S1301).

In this case, a new third image may be generated by applying the A (ALPHA) value corresponding to the selected transparency level among the RGBA values of the third image (S1302).

In addition, a new first image may be generated by combining the third image generated in S1302 with the pre-generated second image related to the extracted contour line (S1303).

In addition, the generated first image generated in S1303 may be displayed in a state in which it is overlapped with the photographed image corresponding to the live-view-photographing of the electronic apparatus (S1304).

Meanwhile, in the displaying (S1204), when a precision description menu is selected, the first image may be divided into the plurality of regions and be then displayed together with the photographed image corresponding to the live-view-photographing of the electronic apparatus. When one of the plurality of regions is selected, the selected one region may be enlarged and be then displayed together with the photographed image corresponding to the live-view-photographing of the electronic apparatus.

In addition, the method of controlling an electronic apparatus according to an exemplary embodiment of the present invention may further include storing the generated first image.

In addition, the method of controlling an electronic apparatus according to an exemplary embodiment of the present invention may further include transmitting the generated first image to the image exchange/trade server.

Figure 14:
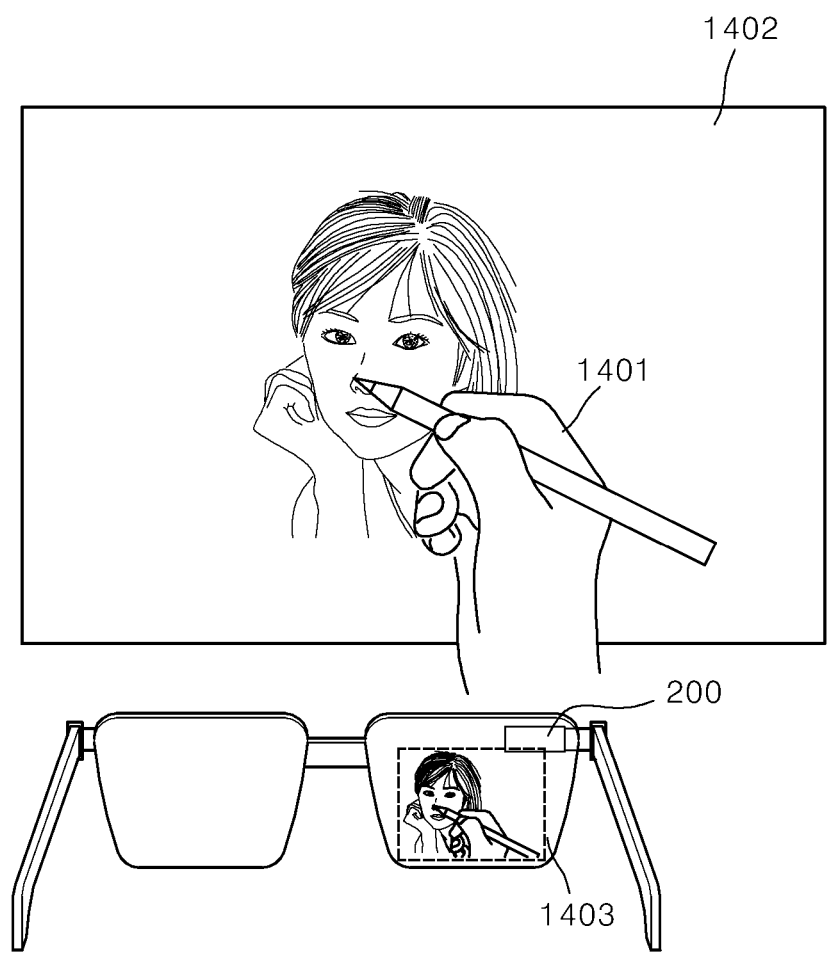
FIG. 14 is a view illustrating an example of a method of viewing and drawing a picture using a wearable electronic apparatus according to an exemplary embodiment of the present invention.

FIG. 14 is a view illustrating an example of a method of viewing and drawing a picture using a wearable electronic apparatus according to an exemplary embodiment of the present invention. Referring to FIG. 14, the wearable electronic apparatus 200 may be implemented as a project glasses as an example. In this case, the user wearing the project glasses may view a 'hand 1401 drawing a picture' and a 'paper 1402 on which the user views and draws the picture while viewing the first image' opened in front of eyes 1403 of the user as the front view, while viewing the 'first image having the contour line and having the adjusted transparency' with his/her eyes 1403 depending on the prism project or the prism display.

Therefore, the user may more easily view and draw the picture on the medium such as the paper using the first image and the front view image viewed with the eyes using the wearable electronic apparatus.

Meanwhile, the method of controlling an electronic apparatus according to various exemplary embodiments of the present invention described above may be implemented by program codes and be provided in the respective servers or apparatuses in a state in which it is stored in various non-transitory computer-readable media.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

The invention claimed is:

1. A method of controlling an electronic apparatus, comprising:
   selecting a specific image;
   generating a first image having a contour line and an adjusted transparency for the selected specific image; and
   displaying on a screen the generated first image in a fixed state in which the generated first image is overlapped with a photographed image corresponding to live-view photographing by the electronic apparatus,
   wherein in the displaying, the screen further displays a first region in which a transparency adjusting target is selected, a second region in which a transparency level is selected, and a third region in which an auto-focusing turn-on/off control for the live-view photographing is selected.

2. The method of controlling an electronic apparatus of claim 1, wherein the generating includes:
   generating a second image by extracting a contour line in the selected image;
   generating a third image by adjusting a transparency in the selected image; and
   generating the first image by combining the generated second and third images with each other.

3. The method of controlling an electronic apparatus of claim 1, wherein the transparency adjusting target includes at least one of the contour line included in the first image and a region except for the contour line in the first image, and
   in the generating of the first image, the first image is generated on the basis of the transparency adjusting target selected in the first region and the transparency level selected in the second region.

4. The method of controlling an electronic apparatus of claim 3, wherein in the generating of the first image, the first image is generated by applying an A (ALPHA) value corresponding to the selected transparency level among RGBA values of the selected image.

5. The method of controlling an electronic apparatus of claim 1, wherein in the displaying, the photographed image is disposed at a lower layer, and the generated first image is disposed at an upper layer, such that the photographed image and the generated first image are displayed in a state in which they are overlapped with each other.

6. The method of controlling an electronic apparatus of claim 1, wherein in the displaying,
when a precision description menu is selected, the first image is divided into a plurality of regions and is then displayed together with the photographed image corresponding to the live-view photographing by the electronic apparatus, and
when one of the plurality of regions is selected, the selected one region is enlarged and is then displayed in a state in which it is overlapped with the photographed image corresponding to the live-view photographing by the electronic apparatus.

7. The method of controlling an electronic apparatus of claim 1, further comprising transmitting the generated first image to an image exchange/trade server.

8. An electronic apparatus comprising:
a photographing unit;
a display unit displaying a screen;
an input unit receiving a user input for selecting a specific image; and
a control processor generating a first image having a contour line and an adjusted transparency for the selected specific image and controlling the display unit to display the first image in a fixed state in which the first image is overlapped with a photographed image corresponding to live-view photographing by the electronic apparatus,
wherein the control processor controls the display unit to further display on the screen a first region in which a transparency adjusting target is selected, a second region in which a transparency level is selected, and a third region in which an auto-focusing turn-on/off control for the live-view photographing is selected.

9. The electronic apparatus of claim 8, wherein the control processor generates a second image by extracting a contour line in the selected image, generates a third image by adjusting a transparency in the selected image, and generates the first image by combining the generated second and third images with each other.

10. The electronic apparatus of claim 8, wherein the transparency adjusting target includes at least one of the contour line included in the first image and a region except for the contour line, and
the control processor generates the first image on the basis of the transparency adjusting target selected in the first region and the transparency level selected in the second region.

11. The electronic apparatus of claim 10, wherein the control processor generates the first image by applying an A (ALPHA) value corresponding to the selected transparency level among RGBA values of the selected image.

12. The electronic apparatus of claim 8, further comprising a storing unit, wherein the control processor controls the storing unit to store the generated first image in a separate folder for the first image.

13. A non-transitory computer-readable recording medium in which program codes for performing a method of controlling an electronic apparatus are recorded, wherein the method of controlling an electronic apparatus includes:
selecting a specific image;
generating a first image having a contour line and an adjusted transparency for the selected specific image; and
displaying on a screen the generated first image in a fixed state in which the generated first image is overlapped with a photographed image corresponding to live-view photographing by the electronic apparatus,
wherein in the displaying, the screen further displays a first region in which a transparency adjusting target is selected, a second region in which a transparency level is selected, and a third region in which an auto-focusing turn-on/off control for the live-view photographing is selected.

* * * * *